United States Patent [19]
Guenter

[11] Patent Number: 5,604,856
[45] Date of Patent: Feb. 18, 1997

[54] MOTION COMPENSATED NOISE REDUCTION METHOD AND SYSTEM FOR COMPUTER GENERATED IMAGES

[75] Inventor: Brian Guenter, Redmond, Wash.

[73] Assignee: Microsoft Corporation, Redmond, Wash.

[21] Appl. No.: 322,958

[22] Filed: Oct. 13, 1994

[51] Int. Cl.$^6$ .............................. G06T 7/20; G06T 13/00; G06T 15/70

[52] U.S. Cl. .......................... 395/173; 395/133; 382/286; 348/607; 348/699

[58] Field of Search ........................... 395/152, 130–133; 348/606, 607, 620, 413; 382/286, 232

[56] References Cited

U.S. PATENT DOCUMENTS

| | | | |
|---|---|---|---|
| 5,361,105 | 11/1994 | Lu ............................................ | 348/699 |
| 5,428,693 | 6/1995 | Murakami et al. ...................... | 382/232 |
| 5,438,374 | 8/1995 | Yan ......................................... | 348/620 |
| 5,502,489 | 3/1996 | Kime et al. ............................. | 348/607 |

OTHER PUBLICATIONS

Guenter, B et al.; *Motion Compensated Compression of Computer Animation Frames*, Computer Graphics Proceedings, Annual Conf. Series, 1993; pp. 297–303.

Cook, R; *Stochastic Sampling in Computer Graphics*, ACM Transactions on Graphics, vol. 5, No. 1, Jan. 1986, pp. 51–72.

Parker, J. et al.; *Comparison of Interpolating Methods for Image Resampling*, IEE Transactions on Medical Imaging, vol. 1 MI–2, No. 1, Mar. 1993, pp. 31–39.

Seyler, A. J. et al.; *Detail Perception after Scene Changes in Television Image Presentations*, IEEE Transactions on Information Theory, Jan. pp. 31–43, 1965.

Peachey, Darwyn R.; *Solid Texturing of Complex Surfaces*, SIGGRAPH, vol. 18, No. 3, Jul., 1985, pp. 279–286.

Perlin, Ken; *An Image Synthesizer*, SIGGRAPH, vol. 19, No. 3, Jul. 1985, pp. 287–296.

Shinya, Mikio; *Spatial Anti–aliasing for Animation Sequences with Spatio–temporal Filtering*, Computer Graphics Proceedings, Annual Conf. Series, 1993 pp. 289–296.

Cook, Robert et al.; *A Reflectance Model for Computer Graphics*, ACM Trans. on Graphics, vol. 1, No. 1, Jan. 1982 pp. 7–24.

Lee, "A Note on the Use of Nonlinear Filtering in Computer Graphics", IEEE Computer Graphics and Applications Magazine, May 1990, pp. 23–29.

*Primary Examiner*—Heather R. Herndon
*Assistant Examiner*—Stephen Hong
*Attorney, Agent, or Firm*—Lee & Hayes, PLLC

[57] ABSTRACT

A system and method are provided to reduce noise in computer generated images. A source object is stochastically sampled to generate a frame image which appears in motion through multiple successive frames. The motion of the frame image is predicted and the samples taken at the predicted location in various projected frames are used to generate an improved, antialiased, noise-reduced image in a single reference frame. By using stochastically obtained samples from multiple frames, the noise reduction technique provides many additional samples without any additional cost of creating them.

30 Claims, 9 Drawing Sheets

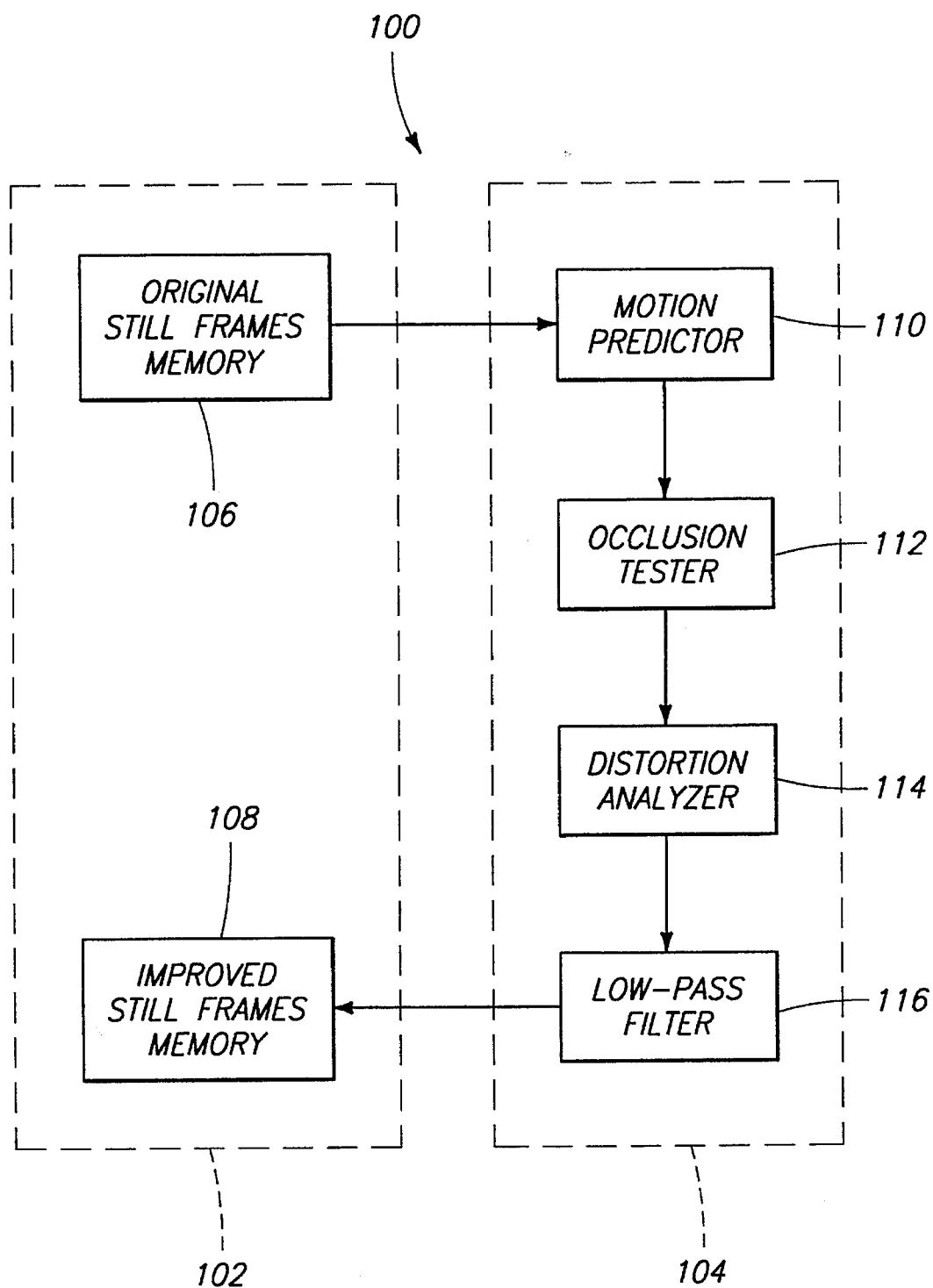

MOTION COMPENSATED NOISE REDUCTION METHOD AND SYSTEM FOR COMPUTER GENERATED IMAGES

TECHNICAL FIELD

This invention relates to computer animation, and more particularly, to methods for reducing aliasing and noise in computer generated images used in the animation.

BACKGROUND OF THE INVENTION

Animation is the process of simulating movement by displaying a series of successive images on a visual display screen. One common approach in computer animation is to create many static frames which contain various images overlaid on a background. Images which are to be depicted in motion have slightly different positions in each frame. The frames are shown sequentially according to an animation script at a sufficient speed that the images appear in motion across the visual display screen.

For successful animation sequences, images must replace one another rapidly enough to fool the eye into seeing continuous movement. An appropriate threshold rate is 14 frames per second (fps). Broadcast-quality animation typically ranges from 14 to 30 fps. Television sets run at a constant rate of 30 fps. Film animation displays at 24 fps. Animation of cartoons for film is played at 24 fps, with each frame being displayed twice in sequence.

Computer animation is a type of animation where the frame images are generated electronically. In computer animation, the animator defines an object according to a mathematical function or model. A computer program uses the mathematical function to derive various two dimensional images of the object which can be shown on the visual display screen.

Computer animation can be created in real-time, in which each frame is created as the viewer watches. The objects portrayed in real time animation are typically very simplistic so that the computer can quickly generate the images and transfer them to the visual display screen. Computers today typically animate objects in real-time at 4–14 fps, although a few very powerful computers can animate graphics at 30 fps.

Computer animation can also be created in simulated time where still frames are generated and then subsequently arranged in a real time presentation via other media formats, such as print, photography, film, or video. In this manner, the computer can spend minutes or even hours creating each still frame, but the display of the frames can be performed at any desired speed.

One problem encountered in computer animation is "aliasing." This problem arises because the object being portrayed on screen is described by a continuous and non-bandlimited mathematical function. The display screen, however, is composed of a matrix of discrete pixels (short for "picture elements"). To represent the continuous object, referred to as the "source object", in terms of discrete pixels, the computer calculates numerous samples of the object based on the mathematical function to derive pixel datum. The pixel datum is used to illuminate the screen pixels. Some information contained in the source object is lost due to this sampling technique.

According to the Nyquist limit, only those frequencies that are lower than one-half of the sampling rate can be accurately represented. An attempt to display frequencies greater than the Nyquist limit can produce aliasing artifacts. Common types of aliasing artifacts include "jaggies" on the edges of objects, jagged highlights, strobing and other forms of temporal aliasing, and patterns in texture. Aliasing artifacts are unacceptable in computer animation, particularly in animation attempting to yield realistic images.

Two prior art solutions to reduce aliasing artifacts are "supersampling" and "adaptive sampling". Supersampling involves using more than one regularly spaced sample per pixel. It reduces aliasing by raising the Nyquist limit, but does not eliminate aliasing. Adaptive sampling adds additional rays near the object edges. "Rays" are generated according to a complex image synthesizing technique known as "ray tracing" which calculates the attributes of each pixel in relation to the viewer, to other objects in the image, and to the light source for the image. The attributes are computed by tracing single rays of light backward to see the way the rays were affected as they traveled from the defined source of light illuminating the object, to the object, and to the viewer's eye. Adaptive sampling reduces aliasing at the edges, but often requires a large number of rays.

Another prior art solution, known as "stochastic sampling", effectively eliminates aliasing. In stochastic sampling, an image is sampled at random irregular spaced locations rather than uniform spaced locations. Frequencies above the Nyquist limit are still inadequately sampled, but appear as noise rather than coherent aliasing artifacts. Accordingly, stochastic sampling replaces the highly objectionable aliasing artifacts with tolerable noise. A more detailed discussion of stochastic sampling can be found in the following documents, which are hereby incorporated by reference:

1. *Progress in Computer Graphics: Volume* 1, edited by Zobrist and Sabharwal, Chapter 1 entitled "Stochastic Sampling: Theory and Application" by Mark A. Z. Dippé and Erling Henry Wold, Ablex Publishing Corp., pgs. 1–55; and
2. *Stochastic Sampling in Computer Graphics,* Robert L. Cook, ACM Transactions on Graphics, Vol. 5, No. 1, pgs. 51–72 (January 1986).

To reduce noise in stochastic sampling, more sample points must be taken. Many samples are required to produce images which appear free of noise, especially for procedural textures or the shadowing effects of area light sources. Unfortunately, additional samples are costly. The signal-to-noise ratio is proportional to the square root of the number of samples taken. Accordingly, a significant number of samples must be taken to gain even modest improvement in the signal-to-noise ratio.

Accordingly, there remains a need for techniques to reduce noise introduced by stochastic sampling.

SUMMARY OF THE INVENTION

According to one aspect of this invention, a method is provided to reduce noise in computer generated images by predicting motion of the image through several frames and summing the object samples taken in the multiple frames to generate an improved, antialiased, noise-reduced image in a single frame. By using existing samples from multiple frames, the noise reduction technique provides many additional samples without any additional cost of creating those samples.

In one embodiment, a method includes stochastically sampling a mathematical function representative of a source object to produce a number of samples in multiple frames.

The samples are used to derive pixel intensities for reference pixels in a reference frame and projected pixels in one or more projected frame. The reference and projected pixels portray the source image on the visual display screen in their respective reference and projected frames. A reference pixel in the reference frame which corresponds to a source point on the source object is selected.

The method then predicts motion of the computer generated image from a reference location in the reference frame to projected locations in projected frames. This is done on an image point-by-image point basis. It is next determined whether any frame image points in the projected frames is occluded by another computer generated image. If so, the pixel intensity for the related pixel is discarded since it does not pertain to the same source object. A distortion analysis is also conducted to evaluate any extent that the computer generated image is distorted due to its motion from the reference frame to the projected frame. If too distorted, the pixel intensities of these pixels will also be rejected.

The method then identifies at least one pixel in each projected frame which is adjacent to the projected location of the moving frame image point in the visual display screen, and which also corresponds to the source object. The samples taken for the identified projected pixels are used in conjunction with the samples taken for the reference pixel to increase the effective number of samples for the reference pixel. This is accomplished by filtering the intensities of the projected pixels through a low-pass filter and summing their filtered intensity with the intensity of the reference pixel to derive an improved intensity for the reference pixel.

Also provided is a system for reducing noise in a computer generated image. The system includes a motion predictor to predict motion of a frame image point from its reference location in a reference frame to a projected location in a projected frame. The system also includes an intensity processor which derives an intensity of the reference pixel in the reference frame by using an intensity of one or more pixels in the projected frame which are adjacent to the projected location of the moving image point. An occlusion tester can be further included to determine whether the frame image point in the projected frame is occluded by another computer generated image. A distortion analyzer may also be employed to analyze any extent that the computer generated image is distorted due to its motion from the reference frame to the projected frame.

BRIEF DESCRIPTION OF THE DRAWINGS

The same reference numerals are used throughout the drawings to reference like elements and features.

FIG. 13 is a block diagram of a motion compensated noise reducing system according to this invention.

DETAILED DESCRIPTION OF THE PREFERRED EMBODIMENTS

Figure 1:
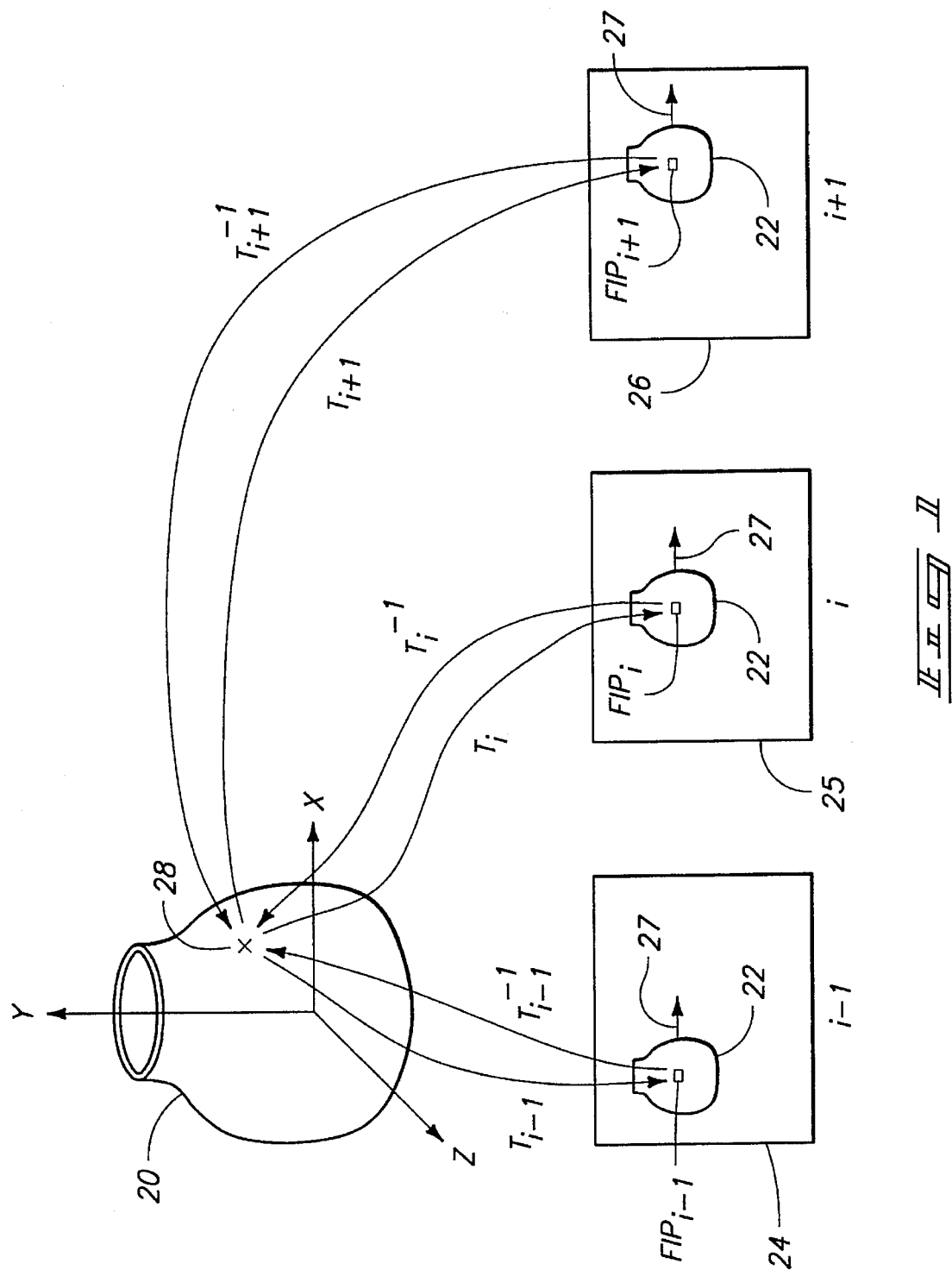
FIG. 1 illustrates a source object in model space being portrayed as a moving frame image in three successive frames i−1, i, and i+1.

FIG. 1 shows a three-dimensional source object 20 oriented arbitrarily in model space represented by a geometric x-y-z coordinate system. The source object 20 is defined by a continuous mathematical function. The illustrated source object resembles a vase or flower pot, although any object can be represented. Through the use of computer generation, the source object can be mapped from three-dimensional model space into two-dimensional screen space using transformation matrices to form a frame image 22. The screen space is physically embodied as a visual display screen, such as a computer monitor, comprising a grid of multiple pixels. An example monitor has 640×480 pixels.

To generate frame image 22, the computer produces pixel datum that is used to actuate related pixels of the visual display screen. Pixel datum generally includes an object number which identifies the corresponding source object, color information (i.e., RBG or greyscale gradations), illumination components, and a depth. The illumination components include four image fields of the basic illumination model: the intrinsic reflectance field, the shadow field, the true specular reflectance field, and the specular spot field. The color information and illumination components shall be referred to throughout this disclosure as the "intensity information" or "intensity values".

The four image fields behave differently under rigid body transformations of objects and lights in a frame. Intrinsic surface reflectance, which includes self luminance and the base color of the object modified by coloration due to procedural texturing, is rbm-predictable when the surface reflectance of an object is not changing with time. Shadows are rbm-predictable when the light, the object casting the shadow, and the object upon which the shadow is cast are in a rigid body relationship to one another over time. True specular reflectance is rbm-predictable when the object or objects visible in the reflection and the surface from which the light is reflected are in a rigid body relationship with each other over time. If the reflected object is itself reflective, this condition applies recursively. The specular spot component is rbm-predictable when the object and the light illuminating it are in a rigid body relationship with each other over time.

The depth parameter of the pixel datum enables the computer to overlay different images on top of one another to create a three-dimensional appearance. Images with the smallest depth parameter are depicted on top of images with larger depth parameters.

The computer generates whole frames, where each frame fills a single display screen. Each frame contains pixel datum for every pixel in the screen. The pixel datum is organized in a memory location, typically referred to as a "frame buffer", in an arrangement corresponding to the pixel grid of the monitor. Multiple frames can be stored and fed sequentially out to the monitor for display.

To map the three-dimensional source object 20 into two-dimensional screen space, the computer samples the mathematical function representing source object 20 to yield intensity values for corresponding pixels in the display screen. The samples from source object 20 are used to form frame image 22 in a series of frames, of which three representative frames 24–26 are shown. Only one frame image is shown in frames 24–26 for clarity purposes. However, each frame in an animation script more typically includes numerous frame images, some moving while others are fixed, as well as a background behind the frame images.

In the three-frame sequence depicted in FIG. 1, the computer generated frame image 22 appears in translational movement from left to right across the visual display screen (as designated by the arrow 27). This motion is synthesized by positioning the frame image 22 at different locations within each successive still frame.

To briefly describe the mapping aspect of computer generated images, consider a source point 28 on source object 20. The source point 28 is sampled and then mapped through a transformation matrix T to each frame. For explanation purposes, it is assumed that a homogenous matrix transformation exists for every object in every frame. Accordingly, the transformation matrix $T_i$ is employed to map the source object 28, including source point 28, to frame i. Different transformation matrices $T_{i-1}$ and $T_{i+1}$ are used to map the source object to frames i–1 and i+1, respectively.

The mapped source point is represented in screen space by a frame image point FIP. The subscript notation of "i–1", "i", and "i+1" denotes the associated frame in which the frame image point FIP is contained. According to principles of matrix algebra, the frame image point FIP can be mapped back onto the source point by the inverse transformation matrix $T^{-1}$. Accordingly, inverse transformation matrices $T_{i-1}^{-1}$, $T_i^{-1}$ and $T_{i+1}^{-1}$ are used to map respective frame image points $FIP_{i-1}$, $FIP_i$, and $FIP_{i+1}$ back onto source point 28.

General Antialiasing and Noise Reduction Technique

When generating two-dimensional frame images made up of discrete pixels from a continuous three-dimensional source object, the resulting image may be subject to aliasing artifacts. This invention, however, provides various methods for eliminating aliasing and reducing noise to yield high-quality, realistic computer generated images.

Figure 2:
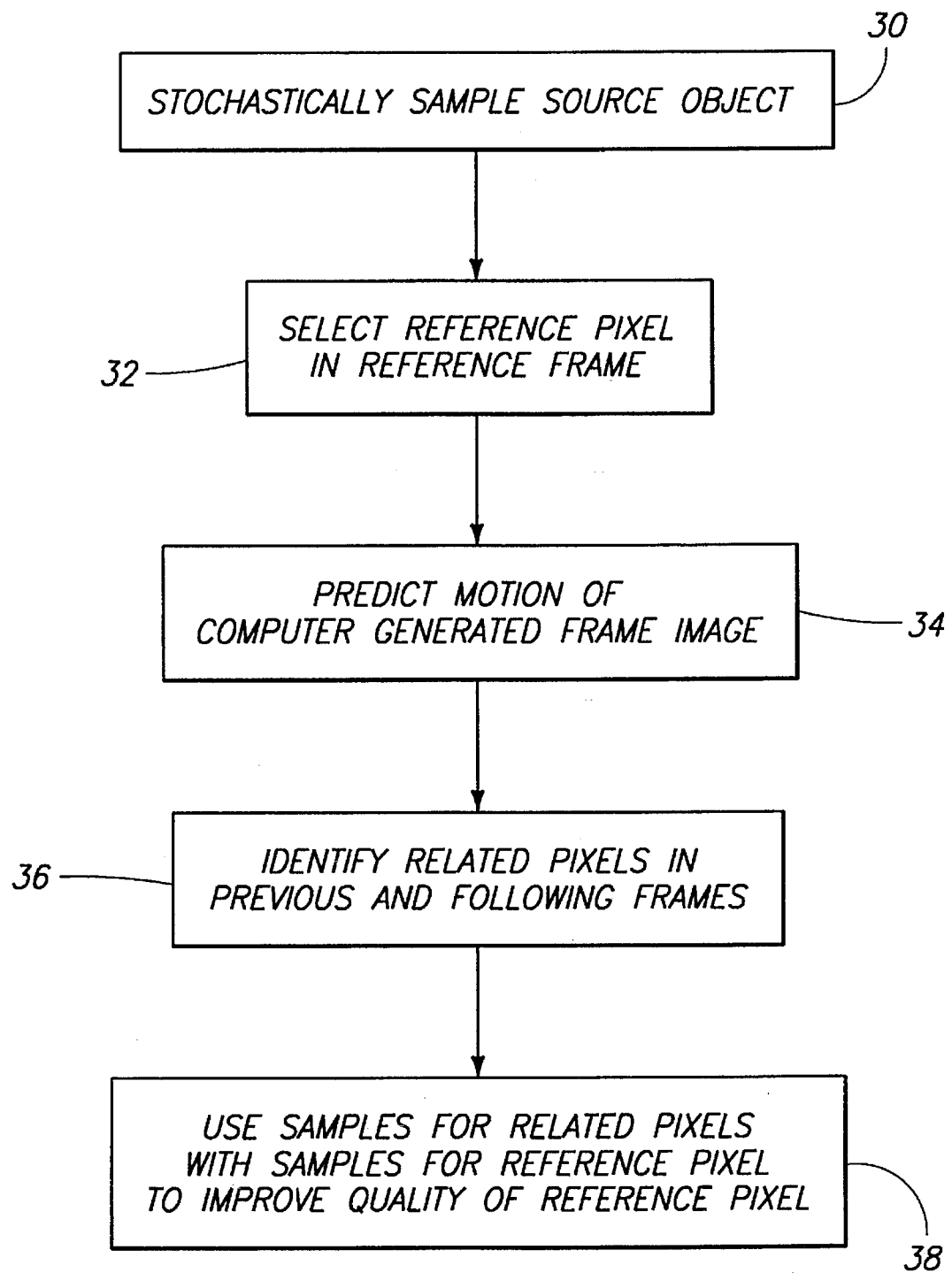
FIG. 2 is a flow diagram of a method for removing aliasing artifacts and reducing noise in computer generated images according to general principles of this invention.

FIG. 2 depicts the general steps according to one aspect of this invention. At step 30, the mathematical function which describes source object 20 is stochastically sampled to produce a number of samples. As described in the Background of the Invention section, stochastic sampling is a well-known technique for eliminating aliasing artifacts. Instead, stochastic sampling replaces the aliasing artifacts with noise. The noise can be reduced by increasing the number of samples. Rather than supersampling each individual pixel, however, this invention provides a technique which increases the number of samples per pixel by extracting samples from pixels used to depict the same image points in other frames.

A reference pixel in a reference frame is selected at step 32. This reference pixel corresponds to, and depicts, a source point on the source image. The reference pixel has an intensity based on a selected number of samples (e.g., 5–10 samples) of the source object at the source point. At step 34, the method predicts the motion of the computer generated frame image from its location in a reference frame to locations in multiple projected frames (e.g., the four frames previous to the reference frame and the four frames following the reference frame). These frames, and the position of the images therein, are already pre-known by virtue of the preconceived animation script.

At step 36, the method identifies pixels in the multiple projected frames that are used to depict the same source point from the source image. Each of these pixels were likewise formed based upon a selected number of samples of the source object. These samples are extracted from the pixels in the projected frames and used with the samples for the reference pixel to thereby improve the quality of the reference pixel (step 38). In this manner, the reference pixel might now be formed based upon a large number of samples (e.g., tens to hundreds of samples) as opposed to the original 5–10 samples. This process yields a significantly improved, antialiased, noise-reduced image in each frame. Moreover, by using samples from multiple frames, many additional samples are used for noise reduction purposes without any additional cost of creating those samples.

Figure 3:
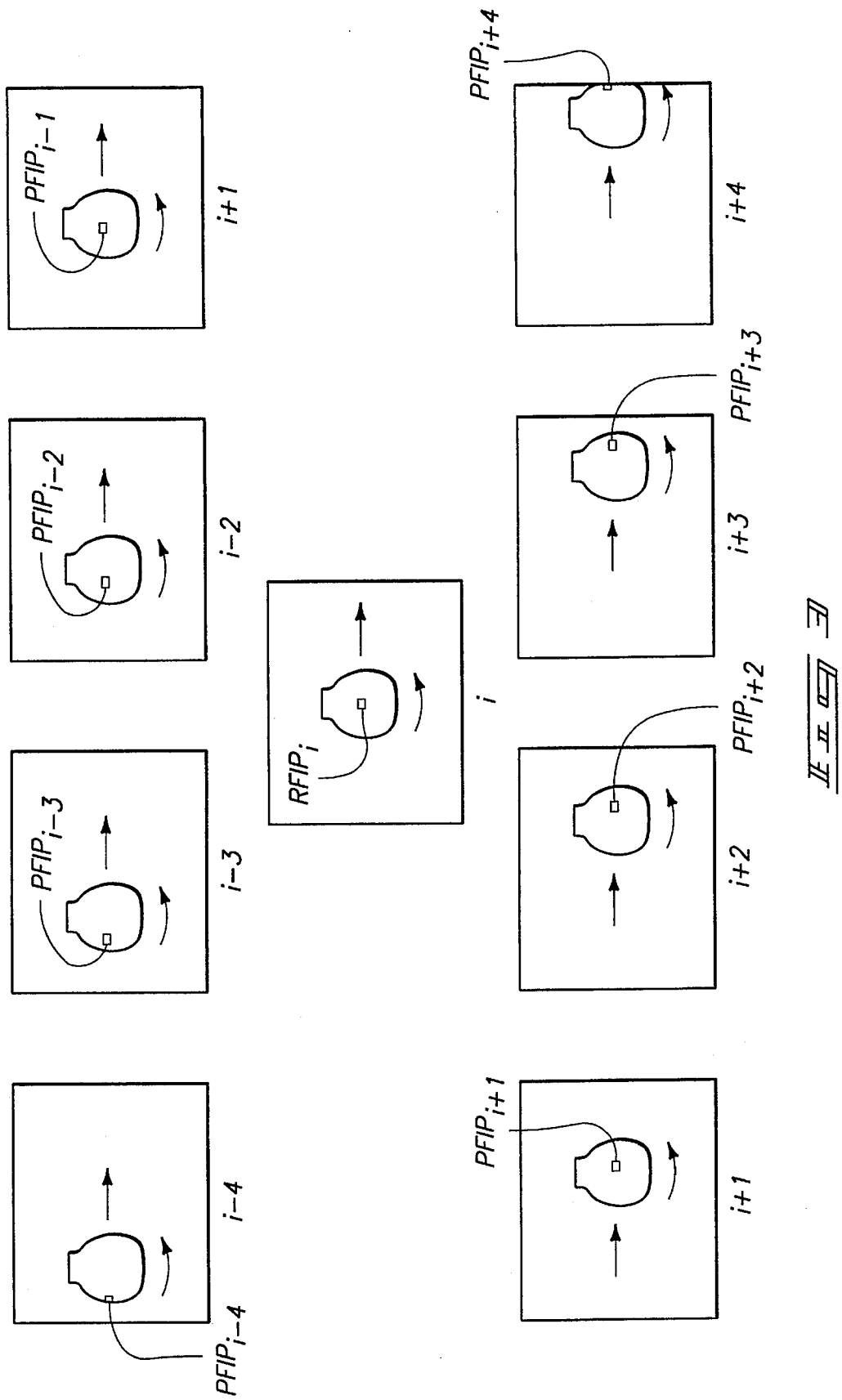
FIG. 3 illustrates a moving frame image in nine successive frames, including one reference frame i and eight neighboring projected frames.

FIG. 3 graphically illustrates the motion compensated noise reduction technique according to the methods of this invention. FIG. 3 shows a series of nine frames i–4, i–3, . . ., i, . . . , i+3, i+4. The middle frame, designated by the letter "i", shall be referred to throughout this disclosure as the "reference frame". Frames other than the reference frame i, such as the illustrated frames designated by "i–4, . . . , i–1" and "i+1, . . . , i+4", shall be referred to as "projected frames". The frame image 22 of source object 20 is depicted both in translational motion from left-to-right across the display screen as indicated by the upper arrow and in rotational motion as indicated by the lower arrow.

A frame image point FIP is also shown in each frame. The frame image point moves across the screen by virtue of the translational and rotational motion of frame image 22. Notice that different pixels are used to depict the frame image point in the various frames. Moreover, it should be appreciated that the frame image point will have different characteristics in the various frames due to image motion, lighting, color reflectance, shadowing, etc.

For purposes of continuing discussion, the frame image point in reference frame i shall be referred to as the "reference" frame image point, designated as $RFIP_i$. The frame image points in the eight projected frames shall be referred to as the "projected" frame image points, designated by PFIP with the appropriate frame number as a subscript.

Each frame image point in each frame is formed by sampling the source object at the same source point and then using a transformation matrix to derive appropriate pixel intensities for the corresponding pixels employed to depict the frame image point. According to the noise reduction techniques of this invention, the motion of reference frame image point $RFIP_i$ is predicted into the eight projected frames, which correlate to the projected frame image points $PFIP_{i-4}, \ldots, PFIP_{i-1}$, and $PFIP_{i+1}, \ldots, PFIP_{i+4}$. The samples taken for the illustrated eight projected frame image points $PFIP_{i-4}$–$PFIP_{i+4}$ are combined with the original samples taken for the reference frame image point $RFIP_i$. By using samples from neighboring frames, the number of samples available to derive the pixel intensity for the reference frame image point $RFIP_i$ in the reference frame is substantially increased, thereby improving the signal-to-noise ratio.

Noise Reduction Methods In More Detail

The methods of this invention will now be described in more detail with reference to FIGS. 4–12. For purposes of continuing discussion, the methods of this invention will be described in the context of improving the quality of an existing series of animated frames that have been generated according to an animation script. It is assumed that each frame contains frame image points which have already been derived based upon samples obtained by stochastically sampling the source object. The methods of this invention are used to reduce the noise in the existing animation frames to improve the quality and realistic appearance of the computer generated images.

Additionally, the following methods will be described in the context of a single frame image point to simplify the explanation. The reference frame image point $RFIP_i$ of reference frame i will be used. This reference frame image point $RFIP_i$ corresponds to a single reference pixel, designated $p_i$, when the reference frame i is depicted on the visual display screen. To improve the quality of an entire image, it should be understood that the method steps described below are performed for each frame image point being depicted on the screen.

Figure 4:
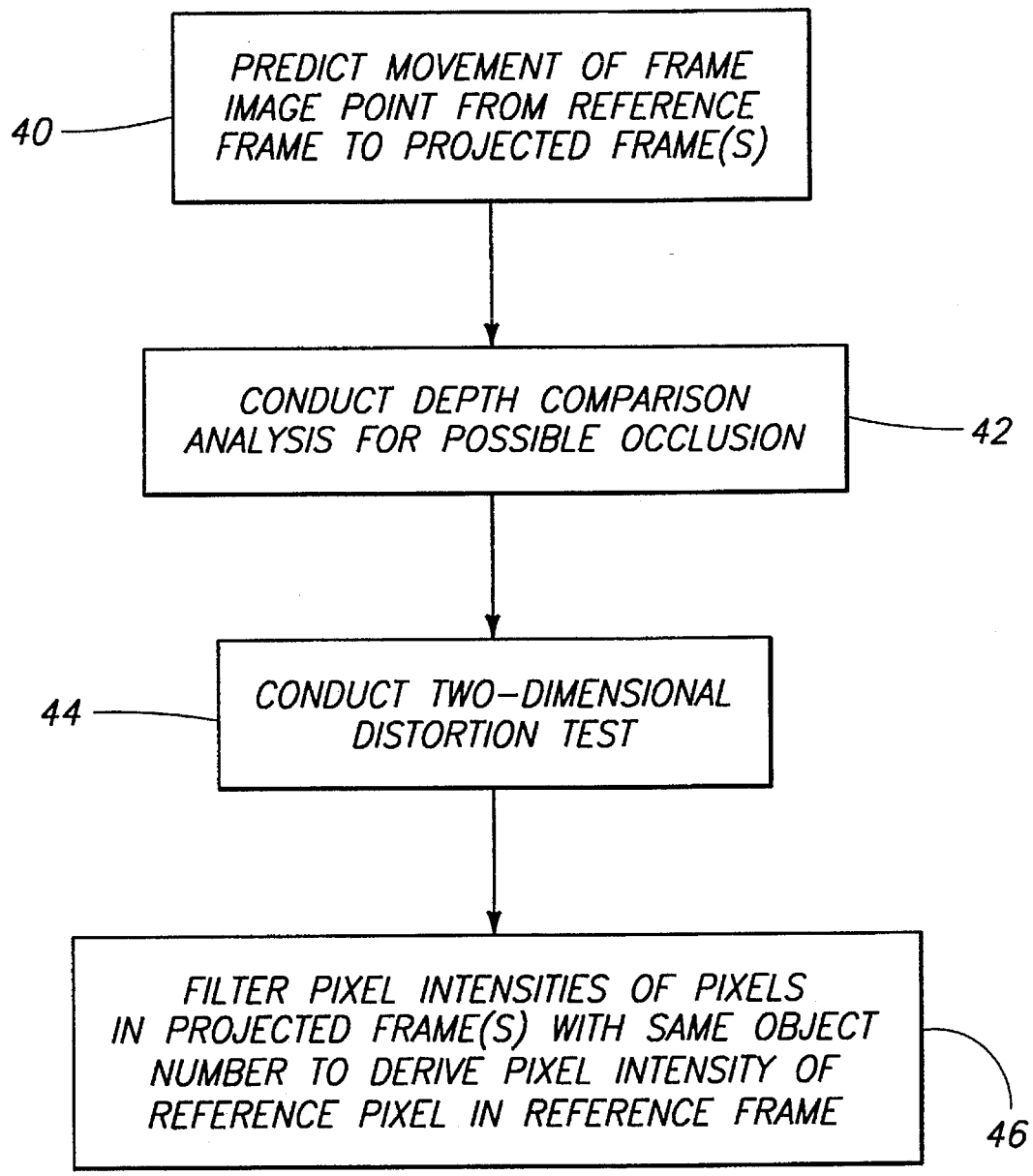
FIG. 4 is a flow diagram illustrating preferred steps for processing individual pixels according to the noise reduction techniques of this invention.

The full motion compensated noise reduction process of this invention essentially entails four basic steps, which are shown in FIG. 4. These steps will be described in detail with reference to the accompanying FIGS. 5–12.

Step 1: Motion Prediction

Figure 5:
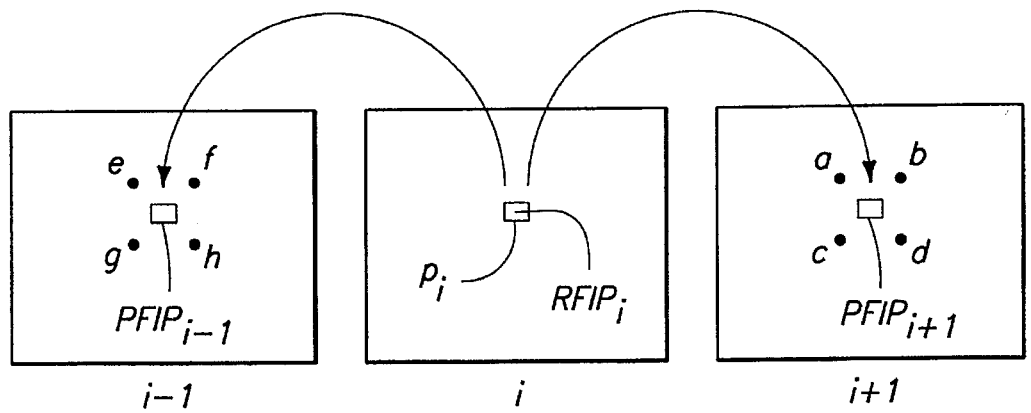
FIG. 5 illustrates motion prediction of a frame image point from a reference frame i to projected frames i−1 and i+1.

At step 40 in FIG. 4, the first basic step is to predict movement of the reference frame image point in the reference frame i to a projected frame image point in a projected frame. FIG. 5 shows the reference frame image point $RFIP_i$ projected into a projected frame image point $PFIP_{i+1}$ in a future projected frame i+1, as well as into a projected frame image point $PFIP_{i-1}$ in a past projected frame i–1. Each projected frame image point relates to the same source point 28 on source object 20 (FIG. 1).

The projected frame image points $PFIP_{i-1}$ and $PFIP_{i+1}$ are computed using a motion prediction relationship rooted in the transformation matrixes that convert between three-dimensional model space and two-dimensional screen space. More particularly, the projected frame image point $PFIP_{i+1}$ is computed by the motion prediction relationship $PFIP_{i+1} = T_{i+1}T_i^{-1}RFIP_i$. With reference to FIG. 1, this relationship effectively maps the reference frame image point back onto the source point 28 using the inverse transformation matrix $T_i^{-1}$, and then subsequently maps the source point 28 onto projected frame i+1 using the transformation matrix $T_{i+1}$.

The projected frame image points will lie in their respective frames within an area defined by four nearest pixels. It is unlikely, although not impossible, that a projected frame image point will correspond directly to a single pixel in the projected frame. More likely, it will land somewhere in the midst of two to four pixels. In FIG. 5, projected frame image point $PFIP_{i+1}$ lies in the middle of pixels a–d (represented by dots) and projected frame image point $PFIP_{i-1}$ lies in the middle of pixels e–h.

Motion prediction of computer animated images is described in more detail in the following journal article, which is hereby incorporated by reference: *Motion Compensated Compression of Computer Animation Frames*, Brian K. Guenter et al., Computer Graphics Proceedings, Annual Conference Series, pgs. 297–303 (August 1993).

Step 2: Occlusion Test

Once the projected frame image points are located, the next primary step is to determine whether the frame image points are occluded in the projected frames by another computer generated image (step 42 in FIG. 4). If the projected frame image points are occluded, then the corresponding pixels are being used to depict a different object. The samples for such pixels would therefore not be useful to the derivation of pixel intensity for the reference pixel since they relate to different objects.

Figure 6:
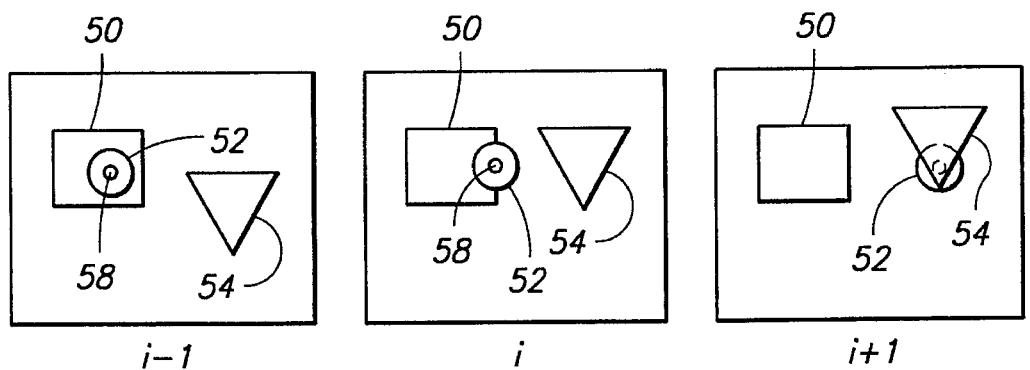
FIG. 6 illustrates frame images moving across a visual display screen and passing over and under each other.

FIG. 6 shows three frame images 50, 52, and 54 in three successive frames i–1, i, and i+1. The square frame image 50 is stationary; the circle frame image 52 is in motion left-to-right across the screen; and the triangle frame image 54 is in motion from bottom-to-top across the screen. Suppose that a frame image point 58 on the circle frame image 52 is being processed. It is visible in reference frame i, as well as in the preceding frame i–1. However, frame image point 58 is occluded in frame i+1 by the triangle frame image 54. The samples taken for the pixels used to depict the frame image point 58 in frames i–1 and i can be used, but samples taken for the corresponding pixel in frame i+1 cannot be used because it depicts an entirely different object, i.e., the triangle frame image 54.

There are various types of depth comparison analyses that can be conducted to determine possible occlusion. Consider the projected frame image point $PFIP_{i+1}$ between the four pixels a–d in FIG. 7 (which is essentially an enlarged view of frame i+1 in FIG. 5). One simple depth test is to compare the depth parameter and object number of the pixel datum used to illuminate pixels a–d to the depth parameter and object number associated with the projected frame image point $PFIP_{i+1}$. If the projected frame image point has a depth parameter which is higher than those in the pixel datum for each pixel a–d, and/or the projected frame image point relates to a different source object, the frame image point will be occluded in that frame.

Figure 7:
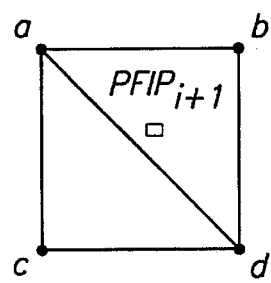
FIG. 7 illustrates a projected frame image point lying within an area defined by four pixels.
Figure 8B:
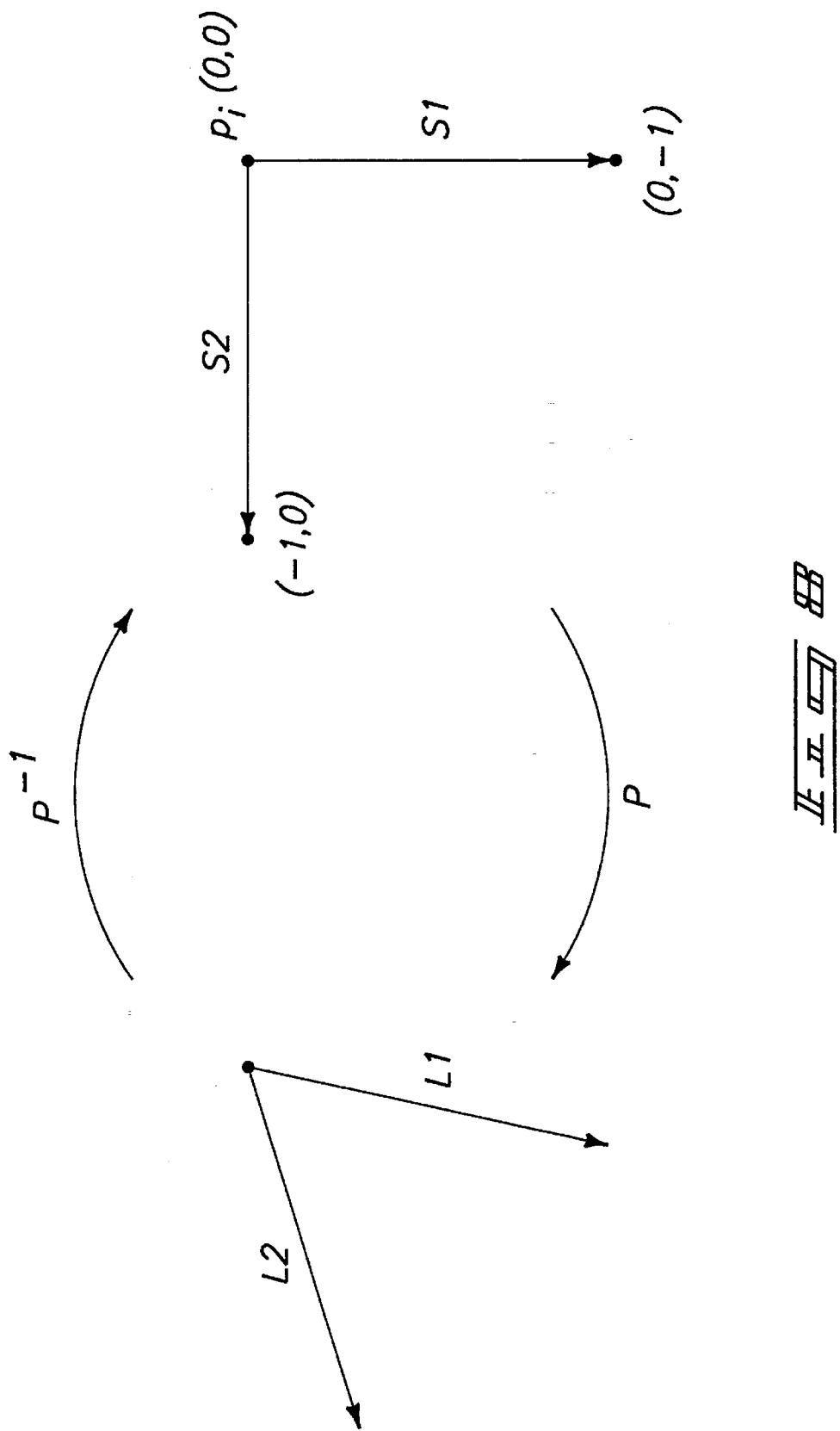
FIG. 8 illustrates a two-dimensional distortion analysis that accounts for image distortion caused by movement of the frame image from its location in one frame to its location in another frame.

Another depth compression analysis is known as a "z-buffer" rendering test which is well-known in the art. Briefly, the z-buffer analysis performs a planar evaluation as illustrated in FIG. 7. The test first computes a plane a-b-d from pixels a, b, and d. This plane can be formulated based upon the depth parameters in the pixel datum used to illuminate these pixels. Once the plane a-b-d is computed and defined in space, the projected frame image point $PFIP_{i+1}$ is evaluated to determine if it lies on top of the plane a-b-d or is hidden behind the plane.

Step 3: Distortion Test

The next basic step in the preferred process is to conduct a two-dimensional distortion test (step 44 in FIG. 4). The distortion test is used to examine how the frame image changes or distorts over time by virtue of its motion across the screen. Consider the frame image point on the frame image illustrated in FIG. 3. It changes in size and shape as the frame image simultaneously moves and rotates across the screen. The distortion test accounts for this ever-evolving change.

Furthermore, in the next step, various pixel intensities of the projected pixels are passed through a spatial filter. For best results, this spatial filter should be warped appropriately to compensate for distortion. If it is not warped, two effects occur: high frequency aliasing artifacts are introduced into the noise reduced image and low frequency components can be amplified, thereby reducing the sharpness of the image. The distortion test therefore provides the analytical framework for deriving the function used to warp the spatial filter.

The true projection of the spatial filter is a complex non-linear function of screen space position. It is too computationally expensive to model precisely. Instead, the filter warping is modeled as a locally linear two dimensional transformation which is approximated by finding a relationship between two pixel length vectors, S1 and S2, in the reference frame and their corresponding transformed vectors, L1 and L2. More particularly, reference frame vectors S1 and S2 can be mapped onto transformed vectors L1 and L2 through a distortion transformation matrix P. This is graphically illustrated in FIG. 8. The distortion transformation matrix P is computed as follows:

$$P = \begin{bmatrix} S1_x & S2_x \\ S1_y & S2_y \end{bmatrix} \begin{bmatrix} L1_x & L2_x \\ L1_y & L2_y \end{bmatrix}^{-1}$$

$$P = \frac{\begin{bmatrix} -1 & 0 \\ 0 & -1 \end{bmatrix} \begin{bmatrix} L2_y & -L2_x \\ -L1_y & L1_x \end{bmatrix}}{L1_x L2_y - L2_x L1_y}$$

$$P = \frac{\begin{bmatrix} -L2_y & L2_x \\ L1_y & -L1_x \end{bmatrix}}{L1_x L2_y - L2_x L1_y}$$

To map transformed vectors L1 and L2 back into the reference frame vectors S1 and S2, respectively, the inverse distortion transformation matrix $P^{-1}$ is used. The normal and inverse distortion matrixes P and $P^{-1}$ will be used in the next and final step 4, described below.

Under certain conditions, the image will be significantly distorted and the resulting pixel information in the projected frame will not be very useful. In such situations, only low spatial frequency information is present in the transformed and filtered signal. This increases the relative power of low spatial frequency information relative to high spatial frequency information and causes the image to lose sharpness. Projected pixels which have primarily low frequency information can be detected through examining the eigenvalues of the distortion transformation matrix P. In general, the eigenvalues are computed as follows:

$$|P - \lambda I| = 0$$

$$\lambda^2 - (a + d)\lambda + (ad - bc) = 0$$

$$\lambda = \frac{k_1 \pm \sqrt{k_1^2 - 4k_2}}{2}$$

where $k_1 = (a+d)$ and $k_2 = (ad-bc)$. The variables a–d equate to the variables provided above in the derivation for matrix P:

$$a = -L2_y/DENOM \quad b = L2_x/DENOM$$
$$c = L1_y/DENOM \quad d = -L1_x/DENOM$$

where $DENOM = L1_x L2_y - L2_x L1_y$.

It turns out that the locally linear transformation matrix P results in a quadratic equation where both eigenvalues can be efficiently computed. Low frequency projected pixels will have at least one eigenvalue greater than one. An appropriate rejection threshold for distortion analysis is an eigenvalue of 1.0 to 2.0, with an eigenvalue of 1.3 being most preferred.

Step 4: Filter

Figure 9:
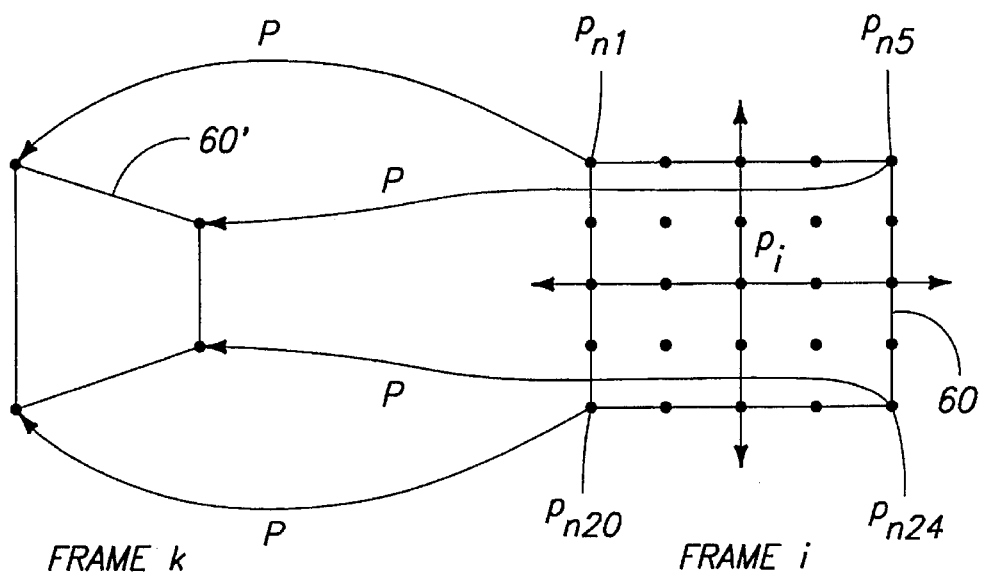
FIG. 9 illustrates a first step in a process of analyzing and weighing pixel intensities of pixels surrounding the reference pixel.

The fourth and final basic step of the preferred process of this invention is to identify neighboring pixels in projected frames that depict the same source object and filter them for ultimate use in improving the pixel intensity of the reference pixel (step 46 in FIG. 4). In FIG. 9, a number of neighboring pixels surrounding reference pixel $p_i$ are selected in reference frame i. Here, twenty-four neighboring pixels $P_{n1}$–$p_{n24}$ are selected. These neighboring pixels define a reference bounding periphery 60 in the form of a box having corners at pixels $p_{n1}$, $p_{n5}$, $p_{n20}$, and $p_{n24}$. The reference frame bounding periphery 60 is next transformed into the projected frame, designated generically as frame "k", using the distortion transformation matrix P which accounts for distortion of the moving computer generated image as described above in step 3. Assume for continuing discussion that the image is distorted by pivoting the bounding box about its left side edge defined by pixels $p_{n1}$ and $p_{n20}$ from its original position in frame i to its pivoted position in frame k (referenced by number 60') so that it appears to swing into the drawing like an opening door.

Figure 10:
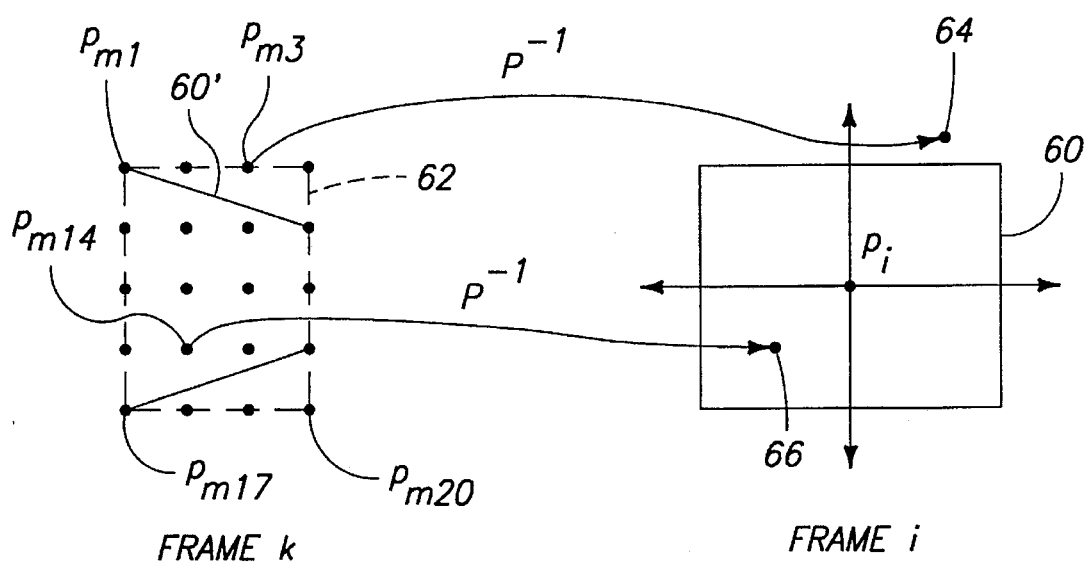
FIG. 10 illustrates a second step of the FIG. 9 process which occurs subsequent to that of FIG. 9.

In the projected frame k, the next task is to define a projected bounding periphery 62 which encompasses the transformed and distorted reference bounding box 60. This is illustrated in FIG. 10. The projected bounding periphery 62 is defined in terms of pixels. In this case, the projected bounding periphery 62 is defined by corner pixels $p_{m1}$, $p_{m4}$, $p_{m17}$, and $p_{m20}$, and contains four columns of five pixels $p_{m1}$–$p_{m20}$.

At this point, those pixels that lie within the projected bounding periphery 62 and are being used to depict the same image can be identified. For instance, projected pixel $p_{m3}$ is transformed from projected frame k back through inverse distortion transformation matrix $P^{-1}$ to a location 64 in reference frame i which is outside of the original bounding periphery 60. The pixel intensity associated with pixel $p_{m3}$ in projected frame k will not be used in deriving an averaged pixel intensity for the desired reference pixel $p_i$. Conversely, projected pixel $p_{m14}$ is transformed through matrix $P^{-1}$ to a location 66 which falls within the reference bounding periphery 60. The pixel intensity associated with this pixel $p_{m14}$ can be used provided that it has the same object number as the reference pixel $p_i$.

Figure 11:
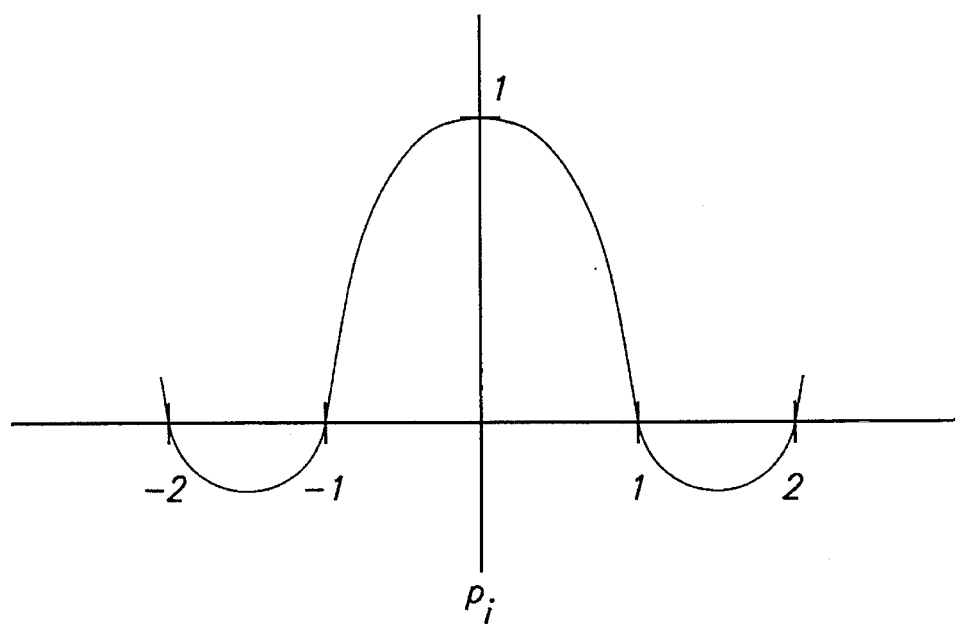
FIG. 11 illustrates a Parker filter used in the FIGS. 9–10 process.

For those pixels which meet the criteria of transforming back into the reference bounding box 60 and having the same object number as the reference pixel $p_i$, their associated pixel intensities are filtered. Preferably, a low-pass filter is employed. One preferred low-pass filter is known as the Parker filter which is shown in FIG. 11. The Parker filter is given by the following function:

$$H(x) = \begin{cases} 0 & x < -2 \text{ or } x > 2 \\ (a+2)|x|^3 - (a+3)x^2 + 1 & 0 \leq |x| \leq 1 \\ a|x|^3 - 5ax^2 + 8a|x| - 4a & 1 \leq |x| \leq 2 \end{cases}$$

The constant "a" is a selectable parameter. For "a"<0, H is positive in the region 0.1 and negative in the region 1.2. More negative values of "a" create larger negative side lobes in the region 1.2 and generally increase the high frequency peaking characteristics of the filter. A value of −0.75 for "a" gives good high frequency rejection and reasonable response in the passband. A detailed discussion of the Parker filter is described in the following article, which is hereby incorporated by reference: *Comparison of Interpolating Methods for Image Resampling*, J. Anthony Parker et al., IEEE Transactions on Medical Imaging, Vol. MI-2, No. 1, pgs. 31–39 (March 1983).

The interpolated pixel intensity for one or more projected pixels in projected frame k is given as follows:

$$I_{pk} = \sum_{i=-2}^{2} \sum_{j=-2}^{2} \delta(o_i, o_k) H(\lfloor p_{kx} \rfloor - p_{kx} + l, \lfloor p_{ky} \rfloor - p_{ky} + j) M^k_{\lfloor p_{kx} \rfloor + l, \lfloor p_{ky} \rfloor + j}$$

where $M^k$ is the matrix storing the pixel intensities for projected frame k. Preferably, this sum is computed separately for each of the color components (e.g. red, blue, and green) of the frame image. The delta function $\delta(o_i, o_k)$ is zero if the object number for projected pixel $p_k$ is different from the source object number to which reference pixel $p_i$ is related. Without the delta function, subtle motion prediction artifacts are introduced into the frame image. By matching the object number of all projected pixels before they are used in computation of the pixel intensity of the reference pixel, this type of motion artifact is eliminated.

The pixel intensity of the projected pixel in projected frame k is then used to help derive a pixel intensity of the reference frame pixel $p_i$ in reference frame i. Preferably, this is accomplished using an averaged summation of the weighted intensities of many projected pixels from many different frames. That is, intensity values from one or more pixels in multiple frames are filtered and summed with the original intensity value for the reference pixel to compute and improved, noise-reduced intensity value for the reference pixel.

The above described four step method identifies all usable pixels from projected frames and filters their intensities for use in deriving an improved intensity of the reference pixel. It is noted that the process is stopped for each projected pixel under evaluation in the event that any one of the tests fails. For instance, if the projected pixel is displaying another computer generated image, indicating that the subject frame image is occluded by the other image, then the occlusion test is failed and the pixel intensity of that projected pixel will be discarded. As another example, pixel intensities from projected pixels in frames where the image is overly distorted are not used.

As noted above, the color components are preferably computed separately and later summed to determine the pixel intensity. The same can be done for the individual illumination components. For instance, the intrinsic reflectance field for the projected pixels can be separately filtered and summed, followed by individual treatment of the shadow field, the true specular reflectance field, and the specular spot field. The illumination components would then later be combined to yield the improved illumination aspect of the reference pixel.

It is noted that the separation of the color components and the illumination components occurs during the fourth step of filtering. The first three general steps of motion prediction, occlusion testing, and distortion testing do not change for each component since they concern the pixel as a whole.

The above four steps were described in reference to a single projected frame for clarity of description. However, this process is preferably conducted for multiple frames. An example number of projected frames is eight, using four frames previous to the reference frame and four frames subsequent to the reference frame. This example is depicted in FIG. 3. The number of projected frames can be fixed or alternatively varied.

Figure 12:
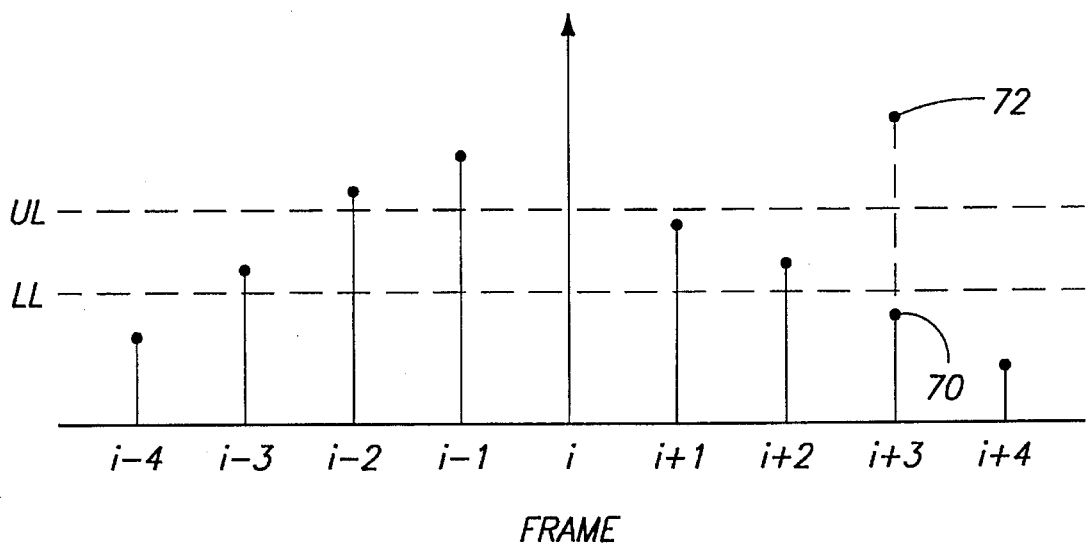
FIG. 12 illustrates a distribution chart for computing the number of projected frames to use.

One approach to varying the number of projected frames within the motion prediction window is shown in FIG. 12. A distribution table is established which shows the percentage of corresponding pixels that are usable from various projected frames i−4, ..., i−1, i+1, ..., i+4. As noted above, some pixels from projected frames will be eliminated because they depict other images, or they portray an image which is too distorted. Threshold levels can then be applied to the distribution table to determine whether the frame should be included. FIG. 12 shows two threshold levels, an upper level UL (e.g., 70% usable pixels) and a lower level LL (e.g., 50% usable pixels).

Different acceptance strategies may be developed based upon these two levels. For instance, a simple strategy would be to accept only those frames that have a percentage exceeding the lower level LL. In this case, a single threshold could be used.

Another example strategy might be to use those projected frames which have a percentage exceeding both the upper level UL and the lower level LL, as well as any frame that neighbors a UL-exceeding frame regardless of whether the neighboring frame itself exceeds any level. In FIG. 12, for example, suppose the projected frame i+3 has a percentage below the lower level UL as indicated by numeral 70. In this case, frames i−3, i−2, i−1, i+1, and i+2 would be used, and frames i−4, i+3, and i+4 would be rejected. On the other hand, if frame i+3 had a percentage exceeding the upper level UL as indicated by numeral 72, then it as well as neighboring frame i+4 would be used, even though frame i+4 does not exceed any level. Alternative strategies can be developed and used.

The methods of this invention are advantageous in that they predict and compensate for image motion as a technique for reducing noise. The methods provide numerous additional stochastic samples from neighboring frames to improve the signal-to-noise ratio in the generated image portrayed in the reference frame. The additional samples are already available and thus do not cost additional resources and time to generate.

FIG. 13 shows a motion compensated noise reducing system 100 constructed according to this invention to carry out the methods described above. System 100 comprises memory 102 and a processing unit 104. Memory 102 includes an original still frames memory 106 which stores the still frames that contain various computer generated frame images according to an animation script. Memory 102 also includes an improved still frames memory 108 which keeps the still frames after they have been improved by the motion compensated, noise reduction techniques of this invention.

Original frames memory 106 is coupled to provide the reference frame and multiple projected frames, or selected portions thereof, to processing unit 104. More particularly, the processing unit 104 has a motion predictor 110 which predicts motion of the frame image point from its reference location in the reference frame to a projected location in the projected frame(s). The motion predictor 110 identifies the pixels in the projected frames that are adjacent to the projected location of the frame image point. The system further includes an intensity processor which derives an intensity of the reference pixel in the reference frame by using the intensities of the adjacent pixels in the projected frames. That is, the intensity processor extracts the samples used to form the pixel intensity of each projected pixel and averages them with the samples for the reference pixel to improve the quality of the reference pixel.

The intensity processor is preferably configured to selectively choose appropriate pixel intensities of projected pixels for use in deriving a pixel intensity for the reference pixel, while discarding unusable pixel intensities. The intensity processor therefore includes multiple components which evaluate whether the projected pixel intensities are usable.

An occlusion tester 112 is coupled to the motion predictor 110 to determine whether the frame image point is occluded in the projected frame. A distortion analyzer 114 is coupled to the occlusion tester 112 (or alternatively, directly to the motion predictor 110) to analyze any extent that the computer generated image is distorted due to its motion from the reference frame to the projected frame. A low-pass filter 116 is also provided to filter the intensities of the adjacent pixels in the projected frames and average them with the intensity of the reference pixel to provide an improved intensity for the reference pixel. The enhanced intensities for the reference pixels are then stored in the improved still frames memory 108.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method for reducing noise in a computer generated image that is created for viewing on a visual display screen, the visual display screen having a matrix of pixels, the method comprising the following steps:

providing a frame image point on a computer generated image in a reference frame, the frame image point corresponding to a reference pixel in the visual display screen when the reference frame is depicted on the visual display screen;

predicting motion of the frame image point from its reference location in the reference frame to a projected location in a projected frame;

deriving an intensity of the reference pixel in the reference frame by using the intensity of one or more pixels in the projected frame which are adjacent to the projected location of the moving image point in the visual display screen when the projected frame is depicted on the visual display screen, the intensity of the reference pixel comprises multiple illumination components selected from a group comprising intrinsic reflectance, shadow, specular reflectance, and specular spot;

breaking the intensity of the one or more adjacent pixel intensities in the projected frame into multiple illumination components which correspond to the illumination components of the reference pixel; and the deriving step comprises independently deriving each illumination component of the reference pixel by using each illumination component in the intensity of the one or more adjacent pixels.

2. A method for reducing noise in a computer generated image that is created for viewing on a visual display screen, the visual display screen having a matrix of pixels, the method comprising the following steps:

providing a frame image point on a computer generated image in a reference frame, the frame image point corresponding to a reference pixel in the visual display screen when the reference frame is depicted on the visual display screen;

predicting motion of the frame image point from its reference location in the reference frame to multiple projected locations in multiple projected frames;

deriving an intensity of the reference pixel in the reference frame by using intensities of multiple pixels in the projected frames which are adjacent to the projected location of the moving image point; and varying in number the multiple frames into which the motion of the frame image point is predicted based upon a number of pixels which are usable from the projected frames.

3. A method for reducing noise in a computer generated image that is created for viewing on a visual display screen, the visual display screen having a matrix of pixels, the method comprising the following steps:

providing a frame image point on a computer generated image in a reference frame, the frame image point corresponding to a reference pixel in the visual display screen when the reference frame is depicted on the visual display screen;

predicting motion of the frame image point from its reference location in the reference frame to a projected location in a projected frame;

analyzing any extent that the computer generated image is distorted due to its motion from the reference frame to the projected frame; and deriving an intensity of the reference pixel in the reference frame by using the intensity of one or more pixels in the projected frame which are adjacent to the projected location of the moving image point in the visual display screen when the projected frame is depicted on the visual display screen.

4. A method according to claim 3 further comprising the step of performing a two dimensional vector analysis to analyze for any distortion in the computer generated image due to its motion from the reference frame to the projected frame.

5. A method according to claim 3 further comprising the additional steps:

performing a two dimensional vector analysis to analyze for any distortion in the computer generated image due to its motion from the reference frame to the projected frame;

computing eigenvalues of the distorted unit vectors in the reference frame; and avoiding use of the pixel intensity from the projected frame when deriving the pixel intensity of the reference pixel in the event that the eigenvalues exceed a selected threshold.

6. A method for reducing noise in a computer generated image that is created for viewing on a visual display screen, the visual display screen having a matrix of pixels, the method comprising the following steps:

providing a frame image point on a computer generated image in a reference frame, the frame image point corresponding to a reference pixel in the visual display screen when the reference frame is depicted on the visual display screen;

predicting motion of the frame image point from its reference location in the reference frame to a projected location in a projected frame;

deriving an intensity of the reference pixel in the reference frame by using the intensity of one or more pixels in the projected frame which are adjacent to the projected location of the moving image point in the visual display screen when the projected frame is depicted on the visual display screen;

determining if the one or more pixels in the projected frame correspond to the same computer generated image to which the frame image point corresponds; and filtering the intensity of the one or more pixels in the projected frame which correspond to the same computer generated image through a low-pass filter prior to using the intensity to derive an intensity of the reference pixel in the reference frame.

7. A method for reducing noise in a computer generated image that is created for viewing on a visual display screen, the visual display screen having a matrix of pixels, the computer generated image being formed by sampling a mathematical function representative of a source object to yield intensity values for corresponding pixels of the display screen, the samples being used to form a series of frames wherein the computer generated image appears in motion across the visual display screen during the series of frames which appear in sequence, the method comprising the following steps:

providing a frame image point on the computer generated image in a reference frame, the frame image point having pixel datum for a corresponding reference pixel in the visual display screen when the reference frame is depicted on the visual display screen, the pixel datum comprising an object number indicative of the source object, multiple color components, and a depth value;

predicting motion of the frame image point from its reference location in the reference frame to a projected location in a projected frame;

determining whether the frame image point in the projected frame is occluded by another computer generated image;

analyzing any extent that the computer generated image is distorted due to its motion from the reference frame to the projected frame;

identifying one or more pixels in the projected frame which are adjacent to the projected location of the moving frame image point;

filtering the intensity of the one or more pixels in the projected frame through a low-pass filter; and summing the filtered intensity of the one or more pixels in the projected frame with the intensity of the reference pixel in the reference frame to derive an improved intensity of the reference pixel.

8. A method according to claim 7 wherein the method is prematurely stopped in the event one of the following occurs: (1) the frame image point is occluded by another computer generated image, and (2) the computer generated image is distorted beyond a selected threshold amount.

9. A method according to claim 7 wherein the one or more pixels in the projected frame are actuated in accordance with associated pixel datum which individually comprises an object number, multiple color components, and a depth value; and the filtering and summing steps comprise filtering the individual color components through a low-pass filter and summing the filtered color components of the one or more pixels in the projected frame with the corresponding color components of the reference pixel in the reference frame.

10. A method according to claim 7 wherein the intensity of the reference pixel comprises multiple illumination components, the method further comprising:

breaking the intensity of the one or more pixel intensities in the projected frame into multiple illumination components which correspond to the illumination components of the reference pixel; and the filtering and summing steps comprise filtering the individual illumination components through a low-pass filter and summing the filtered illumination components of the one or more pixels in the projected frame with the corresponding illumination components of the reference pixel in the reference frame.

11. A method according to claim 7 wherein the occlusion determination step comprises comparing the object number of the pixel datum with object numbers of pixel datum associated with pixels in the projected frame.

12. A method according to claim 7 wherein the occlusion determination step comprises a depth analysis determination using the depth value of the pixel datum.

13. A method for reducing noise in a computer generated image that is created for viewing on a visual display screen, the visual display screen having a matrix of pixels, the computer generated image being formed by sampling a mathematical function representative of a source object to yield intensity values for corresponding pixels of the visual display screen, the samples being used to form a series of frames wherein the computer generated image appears in motion across the visual display screen during the series of frames which appear in sequence, the method comprising the following steps:

(a) providing a source point on the source object, the source point being mapped through a transformation $T_i$ into a reference frame image point $RFIP_i$ in a reference frame i, the reference frame image point $RFIP_i$ corresponding to a reference pixel $p_i$ in the visual display screen when the reference frame i is depicted on the visual display screen;

(b) predicting motion of the reference frame image point $RFIP_i$ in the reference frame i to a projected frame image point $PFIP_k$ in a projected frame k, the projected frame image point $PFIP_k$ also relating to the source point on the source object, the projected frame image point $PFIP_k$ corresponding to the reference frame image point $RFIP_i$ via a motion prediction relationship $PFIP_k = T_k T_i^{-1} RFIP_i$ which accounts for the motion of the computer generated image across the visual display screen from one position in the reference frame i to another position in the projected frame k, the transformation $T_k$ of the motion prediction relationship mapping the source point on the source object into the reference frame k, the projected frame image point $PFIP_k$ being positioned within the projected frame k in an area defined by four nearest pixels $p_{k1}$–$p_{k4}$;

(c) determining whether the projected frame image point $PFIP_k$ is occluded in the projected frame k by another computer generated image;

(d) selecting a number of neighboring pixels $p_{n1}$–$p_{nm}$ surrounding the reference pixel $p_i$ in the reference frame i, the neighboring pixels $p_{n1}$–$p_{nm}$ defining a reference bounding periphery in the reference frame i;

(e) transforming the reference bounding periphery in the reference frame i into the reference frame k using a distortion transformation P which accounts for any distortion of the moving computer generated image from one position in the reference frame i to another position in the projected frame k;

(f) defining a projected bounding periphery within the projected frame k which encompasses the transformed and distorted reference bounding periphery;

(g) identifying pixels in the projected frame k that (1) lie within the projected bounding periphery and (2) are being used to depict the computer generated image, the identified pixels having associated pixel intensities;

(h) filtering the pixel intensities of the identified pixels in the projected frame k using a selected filter to produce filtered pixel intensities; and (i) using the filtered pixel intensities from the projected frame k to derive a pixel intensity of the reference pixel $p_i$ in the reference frame i.

14. A method according to claim 13 wherein:

the four nearest projected pixels $p_{k1}-p_{k4}$ are used to display one or more computer generated images in the projected frame k; and the occlusion determination step (d) comprises determining whether the one or more computer generated images being depicted by the projected pixels $p_{k1}-p_{k4}$ are different than the computer generated image corresponding to the source object.

15. A method according to claim 13 wherein:

the frame image points have associated depth values and a pixel onto which one or more frame image points map depicts the frame image point with the least depth value among the one or more frame image points; and the occlusion determination step (d) comprises conducting a depth analysis test between a depth value associated with the projected frame image point $PFIP_k$ and any depth values of any frame image points from other computer generated images which also map onto the four nearest pixels $p_{k1}-p_{k4}$.

16. A method according to claim 15 wherein the depth analysis test is a z-buffer depth analysis test.

17. A method according to claim 13 wherein:

the four nearest projected pixels $p_{k1}-p_{k4}$ are used to display one or more computer generated images in the projected frame k;

frame image points have associated depth values and a pixel onto which one or more frame image points map depicts the frame image point with the least depth value among the one or more frame image points; and the occlusion determination step (d) comprises the following sequential steps:

determining whether the one or more computer generated images being depicted by the projected pixels $p_{k1}-p_{k4}$ are different than the computer generated image corresponding to the source object; and conducting a depth analysis test between a depth value associated with the projected frame image point $PFIP_k$ and any depth values of any frame image points from other computer generated images which also map onto the four nearest pixels $p_{k1}-p_{k4}$.

18. A method according to claim 13 wherein the projected bounding periphery is defined by pixels in the projected frame k.

19. A method according to claim 13 further comprising the step of calculating the distortion transformation P using a two dimensional vector analysis.

20. A method according to claim 13 further comprising the additional steps:

calculating the distortion transformation P using a two dimensional vector analysis which examines change in unit vectors originating at the reference frame image point $RFIP_i$ in the reference frame i to the same, but distorted, unit vectors originating at the projected frame image point $PFIP_k$ in the reference frame k; and computing the eigenvalues of the distorted unit vectors in the reference frame k.

21. A method according to claim 20 further comprising the step of discarding use of the pixel intensity values from the projected frame k in the event that the eigenvalues exceed a selected threshold.

22. A method according to claim 13 further comprising the step of transforming the identified pixels from the projected frame k back to the reference frame i using an inverse distortion transformation $P^{-1}$; and the filtering step (h) comprises filtering the pixel intensities of the identified pixels through a low-pass filter.

23. A method according to claim 13 wherein the using step (i) comprises averaging the filtered pixel intensities from the projected frame k with the pixel intensity of the reference pixel $p_i$ in the reference frame i to derive an improved pixel intensity of the reference pixel $p_i$.

24. A method according to claim 13 wherein the intensity of the reference pixel $p_i$ comprises multiple color components, the method further comprising:

breaking the pixel intensities of the identified pixels into multiple color components which correspond to the color components of the reference pixel $p_i$;

the filtering step (h) comprises filtering each color component in the pixel intensities of the identified pixels;

the using step (i) comprises using each filtered color component in the pixel intensities of the identified pixels to derive the corresponding color component of the reference pixel $p_i$.

25. A method according to claim 13 wherein the steps (a)–(i) are repeated for multiple projected frames.

26. A method according to claim 25 wherein the multiple projected frames vary in number.

27. A method according to claim 13 wherein the intensity of the reference pixel $p_i$ comprises multiple illumination components, the method further comprising:

breaking the pixel intensities of the identified pixels into multiple illumination components which correspond to the illumination of the reference pixel $p_i$;

the filtering step (h) comprises filtering each illumination component in the pixel intensities of the identified pixels;

the using step (i) comprises using each filtered illumination component in the pixel intensities of the identified pixels to derive the corresponding illumination component of the reference pixel $p_i$.

28. A method according to claim 13 wherein the method is stopped in the event one of the following occurs: (1) the frame image point is occluded by another computer generated image, and (2) the computer generated image is distorted beyond a selected threshold amount.

29. A system for reducing noise in a computer generated image that can be converted into a pixel display, the computer generated image comprising multiple frame image points in a reference frame, the frame image points corresponding to reference pixels in a visual display screen, the system comprising:

a motion predictor to predict motion of a frame image point from its reference location in a reference frame to a projected location in a projected frame;

a distortion analyzer which analyzes any extent that the computer generated image is distorted due to its motion from the reference frame to the projected frame; and an intensity processor which derives an intensity of the reference pixel in the reference frame by using an intensity of one or more pixels in the projected frame which are adjacent to the projected location of the moving image point.

30. A system for reducing noise in a computer generated image that can be converted into a pixel display, the computer generated image comprising multiple frame image points in a reference frame, the frame image points corresponding to reference pixels in a visual display screen, the system comprising:

a motion predictor to predict motion of a frame image point from its reference location in a reference frame to a projected location in a projected frame; and an intensity processor which derives an intensity of the reference pixel in the reference frame by using an intensity of one or more pixels in the projected frame which are adjacent to the projected location of the moving image point, the intensity processor determining if the one or more pixels in the projected frame correspond to the same computer generated image to which the frame image point corresponds, the intensity processor including a low-pass filter which filters the intensity of the one or more adjacent pixels in the projected frame which correspond to the same computer generated image.

* * * * *